United States Patent [19]

Kemmler

[11] 4,343,224
[45] Aug. 10, 1982

[54] AUTOMATIC CONTROL SYSTEM

[75] Inventor: Lothar Kemmler, Mörfelden, Fed. Rep. of Germany

[73] Assignee: Samson Aktiengesellschaft, Frankfurt am Main, Fed. Rep. of Germany

[21] Appl. No.: 85,591

[22] Filed: Oct. 17, 1979

[30] Foreign Application Priority Data

Oct. 31, 1978 [DE] Fed. Rep. of Germany ....... 2847380
Feb. 14, 1979 [DE] Fed. Rep. of Germany ....... 2905577
Feb. 15, 1979 [DE] Fed. Rep. of Germany ....... 2905799

[51] Int. Cl.³ ............................................. F15B 13/16
[52] U.S. Cl. ......................................... 91/47; 91/386; 91/387; 74/89.2
[58] Field of Search ........................... 91/386, 387, 47; 267/156, 59; 92/137, 84, 121; 137/85; 74/89.2, 89.23

[56] References Cited

U.S. PATENT DOCUMENTS

1,077,884 11/1913 Kinney .................................. 92/121
2,930,390 3/1960 Whitehead, Jr. .................... 267/156
3,003,357 10/1961 Votta, Jr. .............................. 74/89.2
3,051,139 8/1962 Thorner ............................... 267/156
3,463,183 8/1969 Wallace ............................... 267/156

Primary Examiner—Paul E. Maslousky
Attorney, Agent, or Firm—Watson, Cole, Grindle & Watson

[57] ABSTRACT

In the case of a pressure-worked automatic control system with a closed loop, and, more specially, a position automatic control system, the position of a servo-element is dependent on a spring placed between the servo-element or servo-motor and the sensing unit of the position automatic control system. The spring, placed between the servo-element or servo-motor and the sensing unit of the position automatic control system, is made up of at least one spiral spring, whose one end is able to be turned by a moving servo-part of the servo-element or servo-motor, while its other end is designed for acting on the sensing unit of the position automatic control system.

7 Claims, 8 Drawing Figures

AUTOMATIC CONTROL SYSTEM

BACKGROUND OF THE INVENTION

(1) Field of the Invention

The invention relates to a pressure-worked automatic control system with a closed loop, and, more specially, a position automatic control system for controllers, such as automatic control valves or the like, air-powered by a servo-motor, in the case of which the position of the servo-element is dependent on a spring placed between the servo-element or servo-motor and the sensing unit of the position automatic control system. Such position automatic control systems are more importantly used for overcoming disturbances, such as friction, changing levels of forces on the valve cone and the like, acting on the servo-element as far as possible. In the case of an automatic control valve with the help of a sensing unit of the position automatic control system a force (or a motion) produced by an actuating pressure is to undergo comparison with a force (or a motion), which, as far as poossible, is representative of the position of the valve driving rod. The force, changing dependently on the valve position, is normally produced by a spring changed in form springingly to a greater or lesser degree by the valve driving rod or any other servo element. The force representative of the actuating pressure is produced between this pressure takes effect on a diaphragm, a Bourdon tube, a piston or the like. If the two representative forces are not in balance an air-power operating system made up, for example of a mouthpiece and a power amplifier, whose input is joined with a plate moved by air from the mouthpiece, has such as effect that the pressure in the servo-motor of the air-power servo-element is changed till the valve driving rod has gone into that position which is representative of the actuating pressure, this being the purpose of the system.

(2) The condition of the art so far.

In past systems a normal screw or helical spring is used as a part representative of the valve position. Furthermore, in place of such a spring, use has been made of torsion rods. The two forms have their shortcomings, as will now be made clear. More specially, past designs take up much space because of their design, this being of little help in making a design of the system in which may be used widely, for example, in industry. The present invention has, more specially, the purpose of decreasing the amount of space needed by such an automatic control system. Further purposes are that of making a simpler design and making the system better with respect to operation and the chances of making adjustments.

SHORT OUTLINE OF THE INVENTION

For effecting these and other purposes, the spring placed between the servo-element or servo-motor and the sensing unit of the position automatic control system is made up of at least one spiral spring, whose one end is able to be turned by a moving servo-part of the servo-element or servo-motor, while its other end is designed for acting on the sensing unit of the position automatic control system.

In an important development of the invention the accuracy of the position automatic control system may be increased by making the design such that the diaphragm of the sensing unit in its resting (or neutral) position is in the same plane as the axis of the twisting shaft of the spiral sensing spring. The plane of the diaphragm will be seen to be running through the cross-axis of the spiral sensing spring. On using a spring bellows in place of the diaphragm, this plane would go through the middle cross-plane of the bellows in its resting (or neutral) position.

In a development of the invention of good effect, use is made, in place of a spiral spring generally made of band material, of at least two side-by-side springs, which, in their effect, are designed for acting separately or together, that is to say summatedly, on the input pressure measuring unit. In this way the way in which the motion of the servo-element is dependent on the actuating pressure and may be changed within wide ranges.

For joining the spiral measuring springs together, a special changing-over system is needed. The change in the range is, however, only possible in certain steps of great size. For this reason, as part of a further development of the invention, for the purpose of changing the range, it is possible to have a greater play with steps which may be made use of as desired because a selection is possible, the changing-over being possible simply and with great accuracy.

This is made possible by the present invention because the spiral measuring spring is placed on the twisting shaft and on the measuring unit in such a way that it may be changed over for an other such spiral measuring spring. In a more specially used form of the invention, the spiral measuring spring with the twisting shaft is designed for being joined with a zero point adjustment system in order to make true adjustment of the system generally possible once a change-over of spiral measuring springs has been made.

In order to be able to undertake the change-over, and, at the same time, the necessary adjustment of the spiral measuring spring in a specially simple and trouble-free way, the system may have sleeves and pieces of pipe designed for working together and bearinged on the twisting shaft. A specially simple form of the invention of good effect is so designed that the inner end of the spiral measuring spring is fixed to a gripping pipe piece which is turningly bearinged on the twisting shaft with which it is, however, joined with an adjustment pipe piece, which may be fixed axially in relation to the gripping pipe piece on the twisting shaft so that it may not be turned. In this respect stops, working together, may be placed on the gripping pipe piece and on the adjustment pipe piece for making possible, in a simple way, the adjustment of the zero point of the spiral spring.

A system designed on the lines of the present invention not only takes up little space, is simple to make and may readily undergo adjustment, but is furthermore responsible for the important further, useful effect of being able to be used for producing changes in angle in the servo-element, as needed, for example, in the case of valve flaps or in the case of valves with slides worked by pinions and screwed rods.

Further useful developments and forms of the invention will now be made clear in more detail in an account of forms of the invention in the figures.

LIST OF FIGURES

Two such forms of the invention are to be seen.

DETAILED ACCOUNT OF EXAMPLES OF THE INVENTION

As a starting point for the account of the forms of the invention, a short outline will now be given of the design and workings of a position automatic control system as used before the present invention. For this purpose, attention is to be given to the air-powered automatic control system to be seen in FIG. 1, which, in an old way, makes use of a normal screw or helical spring for feedback of the motion of a diaphragm valve to the sensing unit.

Figure 1:
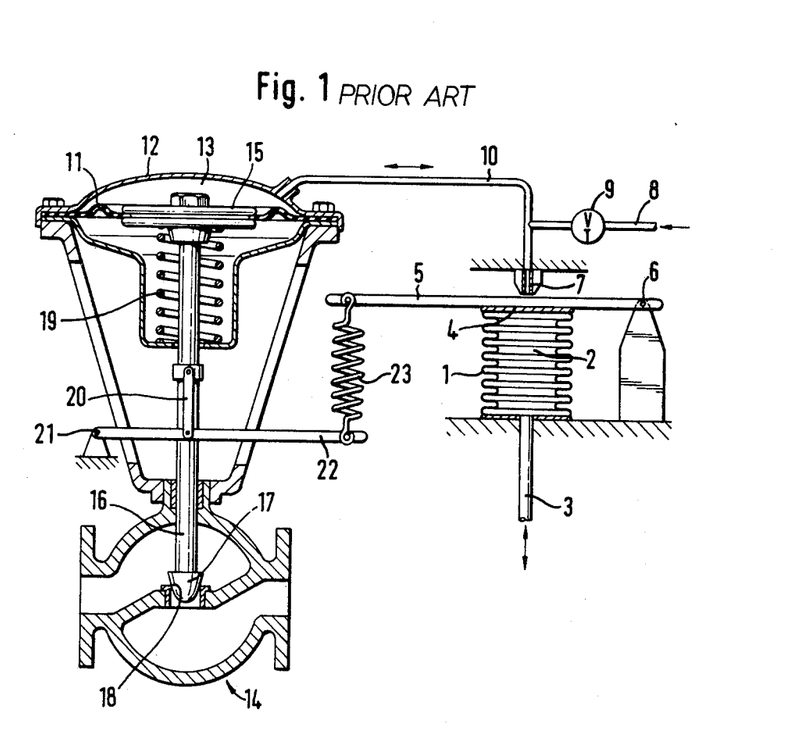
FIG. 1 is a diagrammatic upright cutaway view through a pressure-worked automatic control system of old design.

The sensing unit is made up of a spring bellows 1, into whose inner space 2 the automatic control input signal comes in the form of air pressure running through a measuring or sensing pipe 3. The moving lower wall 4 of the spring bellows 1 is joined with a lever arm 5, which is turningly supported at point 6 with as little friction as possible. The sensing part 1, 4 is used for controlling an air-power switch by way of the lever arm 5, and the outlet mouthpiece 7 of the switch is designed opening over the lever arm 5. It is controlled by way of the arm 5 so as to be representative of the pressure values going to the sensing unit. As a further force use is made of compressed air, running at an unchanging level through the pipe 8 and an input choke 9. From the power switch a control pipe 10 goes to an air-power servo-motor which is designed in some way for working with a piston, a spring bellows, a diaphragm or the like and may be designed for operation of any part which is to be automatically controlled. In the present case the servo-motor is made up of a diaphragm 11, in a housing 12. The working space 13 over the diaphragm 11 is joined with the pressure line 10. The servo-motor is used, for example, for working a rate-control valve 14, for which purpose the diaphragm plate 15 is joined with a valve rod 16 supporting the valve cone 17, which, for its part, is designed for working with a valve seat 18. The valve is opened by a valve spring 19 acting against the diaphragm plate 15. If in the space 13 the air pressure is increased, the valve rod 16 will be moved downwards against the effect of the spring 19, so that the valve cone is moved into its shut position or moved near to such a position. If, on the other hand, the air pressure in the space 13 gets less, the valve rod 16 with the valve cone 17 will be moved under the effect of the spring 19 upwards, this opening the valve. The valve rod 16 is joined by way of an inbetween part 20 with a lever arm 22, which is joined up at turnpin 21. The ends of the lever arms 5 and 22 are joined together by a screw or helical spring 23.

On an increase in the pressure in the inner space 2 of the sensing unit 1, the lever 5 will get nearer the outlet mouthpiece 7, this increasing the air pressure in space 13 of the servo-motor. The diaphragm 11 is moved with the valve rod 16 downwards, the connection spring 23 being stretched so that its force acting against the force of the spring bellows 1, 4 will become greater and greater. When the force produced by the connection spring 23 is nearly equal to the stepped-up force of the spring bellows 1, 4, motion of the lever 5 away from the outlet mouthpiece 7 will be started. Because of this the pressure in the pipe 10 of the power switch and, for this reason, in the space 13 of the servo-motor will go down to such a value as is necessary to keep the force of the connection spring 23 great enough to be in balance with the force of the spring bellows 1, 4, without, however, being any greater than this.

If, for example, the pressure in the spring bellows 1, 4 keeps at an unchanging level, but a disturbance force, for example in the form of an increasing pressure takes effect on the valve cone 17 of valve 14, the valve cone 17 will have a tendency to be moved upwards with the valve rod 16. Because of this upward motion, however, the connection spring 23 will be somewhat relaxed so that the outlet mouthpiece 7 of the power switch will be shut again. Because of this the pressure in the working space 13 of the servo-motor will be increased till the force of the connection spring 23 is again equal to the force of the spring bellows 1, 4. The diaphragm valve will, for this reason, have, generally speaking, not been moved, although the opposite pressure on the valve cone 17 has changed in level, the outcome being that the disturbance force does not have any effect. In fact, the position of the diaphragm valve will only be changed when the actuating pressure in the inner space 2 of the spring bellows 1, 4 is changed. By changing the length of the lever arms 5 or 22, or of the lever turning points 6 or 21, an adjustment may be made with the effect that a certain change in the measuring pressure in the space 2 of the spring bellows 1, 4 is responsible for a smaller or a greater valve motion or that a pressure, for example an increasing pressure, is the cause of the valve being shut or opened.

In order to make the system smaller in height, the height being necessary because of the use of a screw-spring as a connection part between the valve and the position automatic control system, a suggestion has been made in the past to make use of a torsion rod in place of a screw or helix spring, the two ends of the torsion rod each having a separate lever arm, of which the one arm is designated for acting on the pressure sensing unit working with the servo-motor of the valve, while the other lever arm is joined with the servo-motor. These lever arms, necessary for stepping-up the motion produced by the torsion rod, and the great length of the torsion rod, take up much space, that is to say the position automatic control system may not be made to take up little space. The question of the space-need is, however, frequently very important if such a system is to come into general use, more specially, if the automatic control system is to be used or joined up with older systems in existence, such as valve systems, so as to make do with the least amount of space.

The position automatic control system to be seen by way of example in FIGS. 2 to 8, will make it clear to the reader how the shortcomings of past systems may be put to an end by the present invention in a very simple way.

On the same lines as the old automatic control system to be seen in FIG. 1, the servo-element in the two forms of the invention of FIGS. 2 to 5 is made up of a valve body 24, which is joined by way of a frame 25 fixedly with the diaphragm housing 26 of an air-power servo-motor. In the pressure space 28, having an inlet opening 27, of the diaphragm housing 26, there is a working diaphragm 29, whose diaphragm plate 30 is joined fixedly with a valve rod 31. The valve rod 31 is joined with a valve cone 32 working with a valve seat 33. The diaphragm plate 30 is acted upon by the valve springs 34, placed under it, having the tendency of opening the valve against the air-pressure in the pressure space 28.

Figure 2:
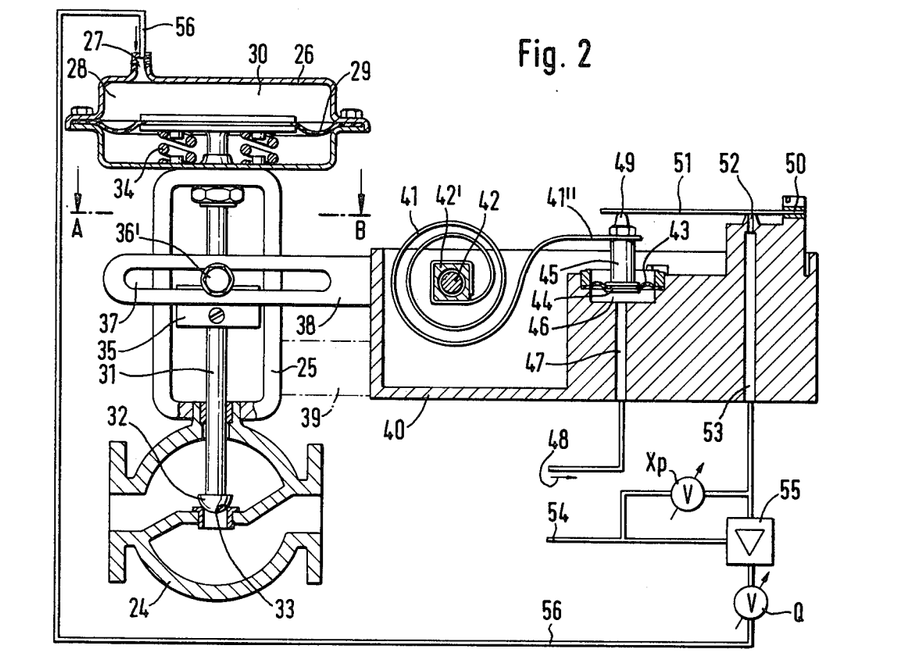
FIG. 2 is a diagrammatic upright cutaway view of an air-powered servo-valve with a position automatic control system.
Figure 3:
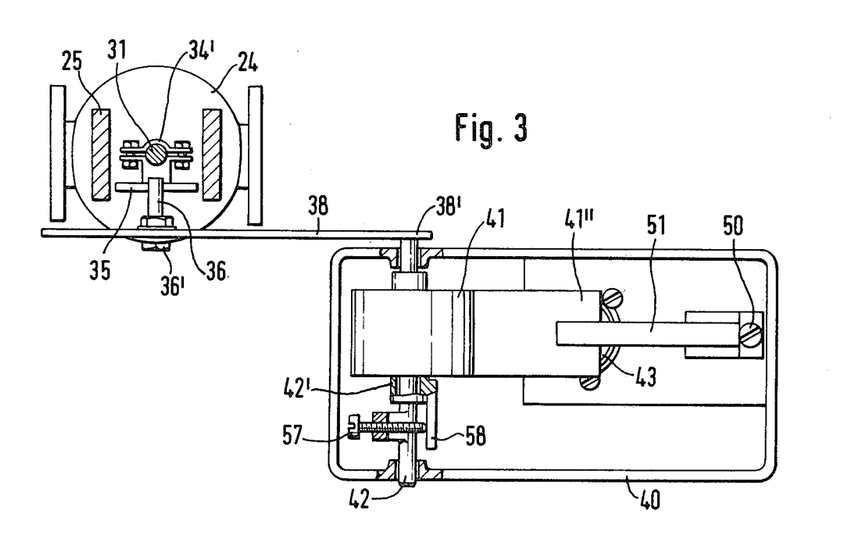
FIG. 3 is a horizontal cutaway view on the line A—B of FIG. 2 of the servo-valve with the position automatic control system seen looking downwards and partly cut away.

On the valve rod 31 an angle piece 35 is fixed with the help of a joining part 34, which may be designed, if necessary, for axial adjustment, and on the angle piece 35 there is a driving pin 36, which may be changed in position, it normally being fixed in position by a gripping force. The outer end of the driving pin 36 may be changed in position within the slot 37 of a lever 38 radially. Using a screw 36' it may be fixed in any position of the driving pin 36 on the support face of the angle piece 35.

Using support parts 39, not presented in full in the figure, the housing 40 of a position automatic control system is joined fixedly with the frame 25 of the valve. This position automatic control system is presented in the figure to be of generally great size in relation to the valve in order to make the figure clearer. As part of the invention, the automatic control system makes use of a position measuring spring in the form of a spiral band spring or spiral spring 41, whose inner end 41' is joined with a twisting shaft 42, bearinged in the housing 40 for turning motion, by way of an eyepiece 42' seated on the twisting shaft 42. The last-named is, for its part, joined with the end 38' of lever 38, which, in this way, is responsible for moving the spiral spring 41 into a more screwed up or less screwed up position when it (lever 38) is moved out of position, seen in the figure.

As part of a specially useful form of the invention, the outer end 41'' of the spiral spring 41 is itself, that is to say more specially without any inbetween further lever, joined with the moving part of a pressure sensing unit, which in this example of the invention is made up of a sensing diaphragm 43, although it would be possible to make use of a spring bellows or the like (FIG. 1) in place of the diaphragm. The diaphragm plate 44 is designed supporting a sensing pin 45, on which the end 41'' of the spiral spring 41 is fixed. In the sensing pressure space 46 within the sensing diaphragm 43 a sensing pressure valve 47 comes to an end, the pipe 47 having within it the changing sensing pressure or pressure signal, as pointed out by input arrow 48.

The head 49 of the sensing pin 45 is designed acting upwards on a moving plate 51 turningly supported at 50 and having the effect of changing the degree of opening of the outlet mouthpiece 52 of a power switch. The outlet mouthpiece 52 gets air at a generally unchanging pressure coming from the inlet air connection 54 and going to mouthpiece 52 by way of a pipe 53 and an input choke $x_p$ whose adjustment is possible. From a power amplifier 55, whose input end is acted upon by the outlet mouthpiece 52, a pressure pipe 56 goes by way of a further choke Q to the pressure space 28 of the diaphragm housing 26 of the servo-motor of the valve.

If, for example the input or actuating pressure gets greater in the sensing pressure space 46 after a disturbance in the balance of the system, the diaphragm 43 will be moved upwards against the effect of the spiral spring 41, lifting, by way of the sensing pin head 49, the moving plate 51 away from the outlet mouthpiece 52, so that the pressure in the inlet air pipe 53 will be decreased and, because of this, the pressure in the pressure pipe 56 coming from the amplifier 55 will be decreased as well. The working pressure in the pressure space 28 of the servo-motor will be decreased representatively and the valve rod 31 will be moved upwards under the effect of the valve springs 34, so that the spiral spring 41 will be twisted, that is to say tensioned, by the lever 38 turning in the direction of a clock, and the twisting shaft 42, till a balance condition is produced again between the force at the diaphragm 43 and the force of the end 42'' of the spiral spring 41. If, on the other hand, the input or actuating pressure is decreased, the functions noted will take place in the opposite direction. In this way, on the same lines as noted in detail in connection with the account of FIG. 1, the disturbance forces acting on the servo-element are overcome and made of no effect, these disturbance forces being, for example, the changing pressures, acting on the valve cone, of the current through the valve, friction forces produced at stuffing boxes, and the like.

The adjustment choke $x_p$ is used for producing a smooth unchanging level in the condition of the automatic control circuit made up of the valve and the servo-relay. In fact, if the amplification gain of the system is overhigh, there will be an undesired motion of the valve backwards and forwards. Furthermore, the adjustment choke is used for making certain of locking to an even greater degree, if necessary, operation conditions at an unchanging level not only of the position automatic control circuit, but furthermore of the automatic control circuit, within the servo-valve with the further relay is used.

As part of a special development of the invention, it is possible to make use of a further unit for adjustment of the zero point and for changing the spring properties or characteristics in connection with the placing of the spiral spring. This further unit is, in a simple form, made up, for example, of a screw 57, acting on a lever 58, the lever being joined with the eyepiece 42' able to be turned on the twisting shaft 42. For this reason, the inner end 41' of the spiral spring 41 may be screwed up or unscrewed in relation to the twisting shaft 42.

A further, useful form of the teaching of the invention is such that on the twisting shaft 42 in place of a single spiral spring, two or more parallely acting spiral springs are placed side-by-side which, as desired, may be caused to take effect on the input pressure measuring unit separately or together as two springs or, as a group of more than two springs. In the case of the form of the invention to be seen in FIGS. 4 and 5, for example, two spiral springs 59 and 60 of different size are used. The connection, desired in a special case, between the outer ends of the spiral springs 59 and 60 with the sensing pin 45 of the sensing diaphragm 53 of the pressure sensing unit may, as part of the invention, be produced with the help of a joining piece 61 able to be turned about the axis of the sensing pin 45. The ends of this joining piece may be joined, for example, using screws 62, 63, with the outer, free ends of the spiral springs 59 or 60. In the position to be seen in FIG. 5 in full lines, the two spiral springs 59 and 60 take effect at the same time by way of the joining piece 61 on the sensing pin 45, while in the position 61' to be seen in broken lines, of the joining part only the spiral spring 59 is joined with the sensing pin 45.

Figure 4:
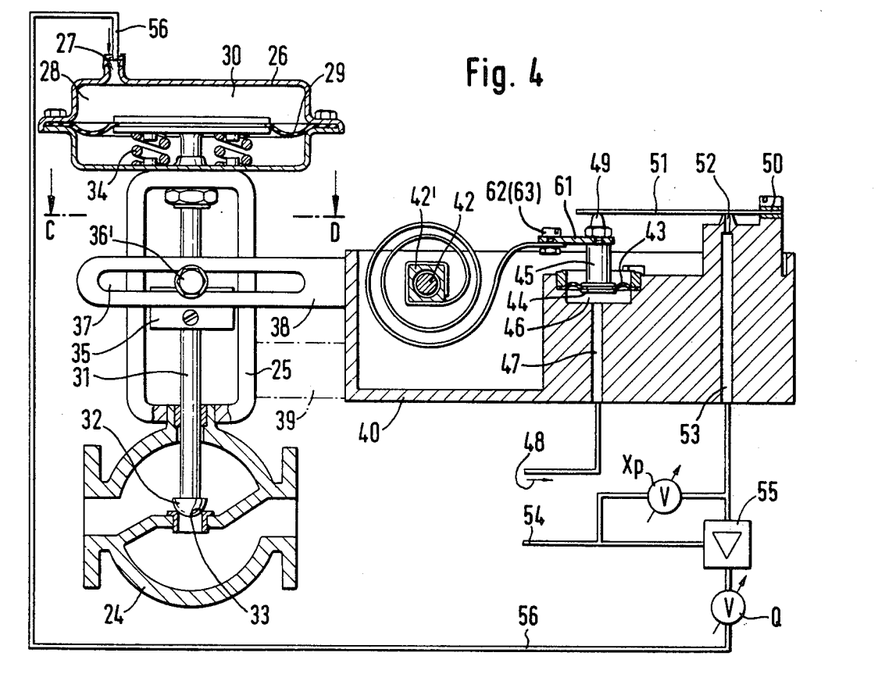
FIG. 4 is a diagrammatic upright cutaway view of the air-powered servo-valve of FIG. 2 with a further design of the position automatic control system of good effect.
Figure 5:
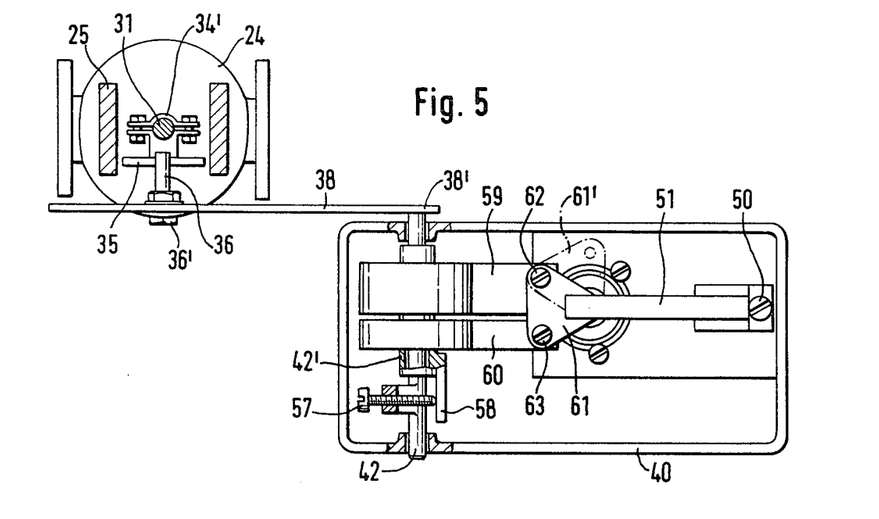
FIG. 5 is a horizontal cutaway view, on the line C—D of FIG. 4, of a servo-valve, again like that of FIG. 3, the automatic position control system being seen partly cut away and looking in a downward direction.

In this respect it is a useful effect of the invention that the spring constants or spring properties or twisting forces of the different spiral springs 59, 60 etc. may be so designed that the relation between them is, for example, 1 to 2 to 4 etc. or the like. In the case of this design, by making the right selection of the acting spiral springs, changes may be made in the relation between the angle, through which the lever 38 of the servo-element is turned, and the force acting on the sensing pin 45 of the pressure sensing unit within wide limits. Furthermore, if desired, the twisting shaft 42 may be so placed that it may be moved radially within a limited space.

Figure 6:
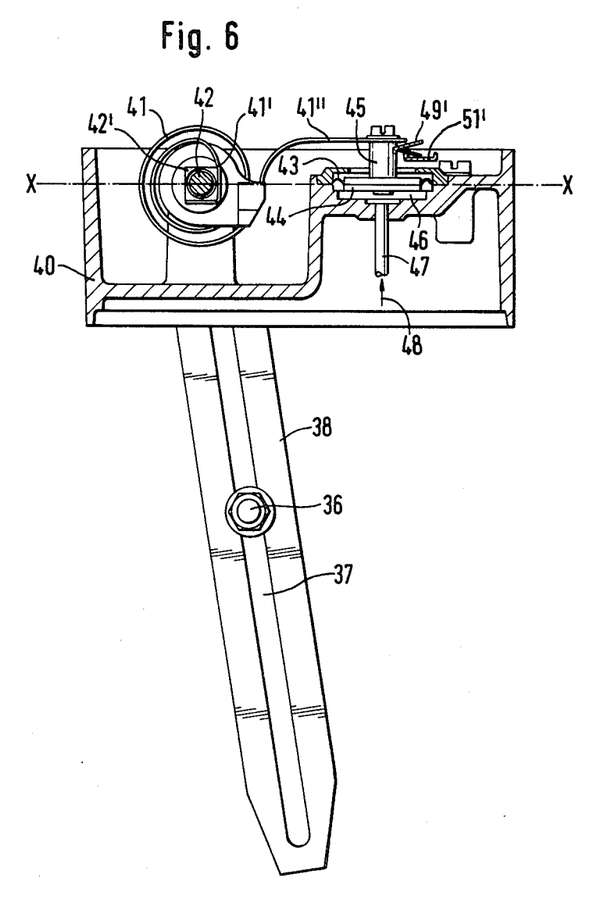
FIG. 6 is a cutaway view, running in the length-direction, with the spiral spring axis in relation to a diaphragm of the sensing unit.

In the case of the form of the position automatic control system to be seen in FIG. 6, the fork 49' is fixed to the pressure sensing pin 45 and is acted upon it in a way dependent on the desired size of effect of the position automatic control system downwards or upwards with an effect on the moving plate 51' springingly supported in housing 40. In the figure, to make do with less space, the moving plate 51' is placed at a right angle to the spiral measuring spring 41, 41". The moving plate 51' is used for controlling the outlet mouthpiece, not to be seen in the figure, of a power switch, whose air input is by way of an input choke at a generally unchanging pressure level. Because of this, by way of a power amplifier, the air power servo-motor of a rate adjustment valve or the like, is worked.

An important idea of the invention is that the diaphragms 43 and 44 in their resting position, to be seen in FIG. 6, are in one and the same horizontal plane X—X with the axis of the twisting shaft 42 of the spiral measuring spring 41, or, putting it differently, the plane of the diaphragm 43, 44 goes through the cross-axis of the spiral measuring spring 41.

On using a spring bellows as a pressure sensing unit in place of the diaphragm, the plane X—X would go in a way with the same effect through the middle cross-plane of the bellows for producing the same desired effect.

Figure 7:
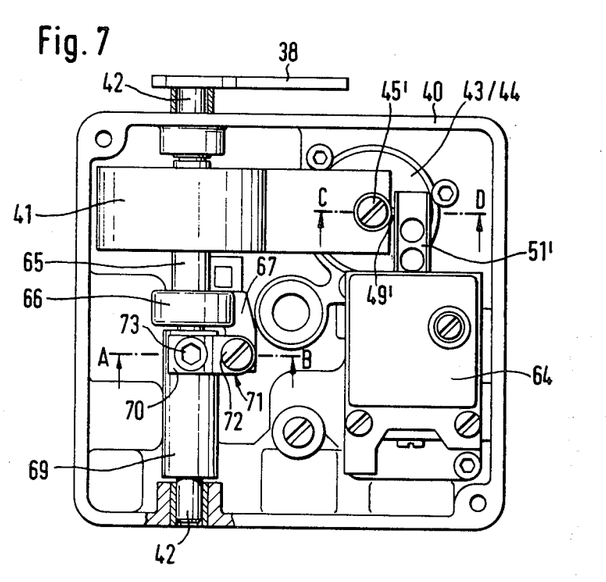
FIG. 7 is a view of a position automatic control system whose spiral measuring spring may be changed over, looking downwards and after taking off the housing cover.
Figure 8:
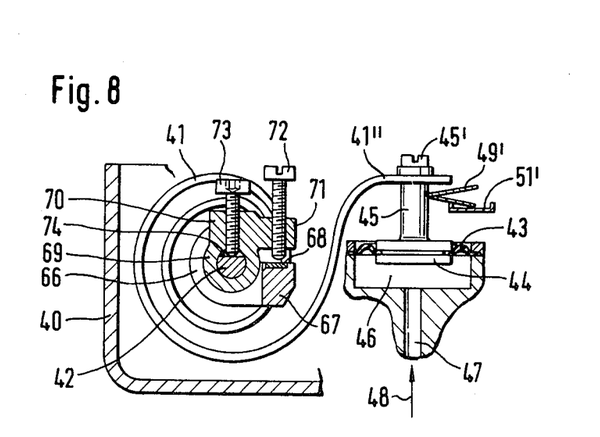
FIG. 8 is a cross-cutaway view on the line A—B of FIG. 7, the sensing unit being pointed out in a cutaway view C—D further back.

In the case of the position automatic control system of FIGS. 7 and 8, the inner end of the spiral measuring spring 41 is joined with a rotatable shaft 42, bearinged in the housing 40, in a way which will now be made clear in more detail. The rotatable shaft 42 is at one side of the housing 40 joined with the end of a driving lever 38, which, by way of a driving pin, is joined with a servo-element, for example with the valve rod of a flow (or rate adjustment valve worked by an air-power servo-motor, the connection being such that the rotatable shaft 42 is turned clear of the driving lever 38 when the valve rod is lifted, and, for this reason, the spiral measuring spring 41 is screwed up.

The outer end 41" of the spiral measuring spring 41 is joined without any further, inbetween lever or lever arm with the moving part of a pressure sensing unit, which is, more specially, made up of a diaphragm 43 in this example of the invention. The diaphragm plate 44 of the sensing diaphragm 43 is used for supporting a pressure sensing pin 45, which is removably joined by way of a screw 45' with the outer end 41" of the spiral measuring spring 41. In the sensing pressure space 46 under the sensing diaphragm 43 there is the opening of a sensing pressure pipe 47, used for the changing sensing pressure, that is to say pressure to be sensed, as is made clear by the input arrow 48 in FIG. 8. The pressure sensing pin 45 takes effect by way of a fork 49', fixed to it, in a downward or an upward direction (dependent on the desired size of effect of the position automatic control system) on the moving plate 51' resiliently supported in the housing 40; this plate, unlike the system of FIGS. 2 to 5, is placed at a right angle to the spiral sensing spring 41, 42" as part of the invention, this being responsible for a system needing very little space. The moving plate 51' is responsible for controlling the outlet mouthpiece, not given in the figure, of a power accumulator 64, which, by way of an input choke, gets air at a generally unchanging pressure level. Because of this, by way of a power amplifier, the air-power servo-motor of a rate adjustment valve or the like is worked.

As part of the invention the spiral measuring spring 41 is placed in the housing 40 of the position automatic control system in such a way that it may be changed over for an other spring. At the same time the system is designed for adjustment of the zero point.

For this purpose the inner end of the spiral measuring spring 41 is fixed to a gripping pipe piece 65, which is bearinged turningly on the rotatable shaft 42, but, however, it may be joined with this shaft 42, as will now be made clear. The end, furtherest from the spiral sensing spring 41, of the gripping pipe piece 65 is joined with a ring 66, which has a nosepiece 67 sticking out to the side, parallel to the rotatable shaft 42, with a stop-face 68.

In front of the ring 66 of the gripping pipe piece 65, an adjustment pipe piece 69, which may be turned and furthermore fixed in position, is seated on the rotatable shaft 42. The pipe piece 69 has a top headpiece 70, running normally to the rotatable shaft 42 and stretching with an arm 71 to a position past the stop face 68 of the headpiece 67 of the ring 66. In a screwed hole of this arm 71 there is a stop screw 72, whose foot end is used for acting on the stop face 68 of the headpiece 67.

Furthermore, a fixing screw 73 is screwed into a threaded hole of the headpiece 70, the screw 73 going through as far as the hole (with the rotatable shaft 42 within it) in the adjustment pipe piece 69. The rotatable shaft 42 has, at this position, a flat face 74 acted upon by the flat foot end of the fixing screw 73 for fixing the adjustment pipe piece 69 on the rotatable shaft 42 fixedly.

To exchange the spiral measuring spring 41 for another such spring, the end 41" of the spiral measuring spring is undone from the pressure sensing pin 45 by screwing the screw 45' out of the pressure sensing pin. Next the fixing screw 73 is screwed back to such a degree that it is far enough from the flat part 74 of the rotatable shaft 42, so that after this the rotatable shaft 42 may be taken out of its bearings. The gripping pipe piece 65 with the spiral measuring spring 41 is, for this reason, freed and may be replaced by another spiral measuring spring designed for a further desired range, together with the gripping pipe piece joined with it. In this respect it is enough for the rotatable shaft 42 to be pushed through the gripping pipe piece 65 and then through the adjustment pipe piece 69. Then it would only be necessary for the fixing screw 73 to be screwed so far into the headpiece 70 that its foot end comes up against the flat part 74 of the rotatable shaft 42. Finally, the outer end 41" of the newly replaced spiral measuring spring 41 is fixed, using screw 45' back in the pressure sensing pin 45 of the sensing unit 43, 44.

It will be clear to the reader that the invention is, naturally enough, not limited to the examples of it, of which an account has been given in connection with the figures and in fact the invention may be taken as covering all changes in these working examples which make use of the general teachings of the invention.

I claim:

1. An automatic position control mechanism powered by a servo-motor, comprising:
    a housing;
    a servo driven element rotatable about an axis;
    a rotatable shaft mounted in said housing along said axis;
    a sensing unit for sensing pressure including a diaphragm member responsive to the sensed pressure and having a rest position in a common plane with the axis of said rotatable shaft; and
    a spiral spring having one end connected to said rotatable shaft such that the tension of said spiral spring is increased and decreased in accordance with the rotation of said servo driven element, and another end connected by a pin to said diaphragm member to transmit the tension of said spiral spring to said pressure sensing unit, said servo driven element being connected to said rotatable shaft.

2. An automatic position control mechanism as claimed in claim 1, further comprising an adjustment pipe adapted to be positioned about said rotatable shaft and fixed thereto at different positions thereon for adjusting the rotational position of said shaft with respect to said one end of said spiral spring.

3. An automatic position control mechanism as claimed in claim 2 wherein said adjustment pipe member includes an arm and an adjustment screw extending through said arm, and further comprising a nosepiece adapted to be mounted to said rotatable shaft, said adjustment screw being adapted to engage said nosepiece to rotate said rotatable shaft with respect to said one end of said spiral spring to provide a zero point adjustment of the automatic position control mechanism.

4. An automatic position control mechanism as in claim 3 further comprising a ring member and including a gripping pipe member attached thereto and said gripping pipe member being movably attachable to said rotatable shaft, and said nosepiece forming part of said ring member.

5. An automatic position control mechanism as in claim 4 wherein said nosepiece and said arm are in a plane substantially parallel to the coil of said spiral spring.

6. An automatic position control mechanism as in claim 5 wherein said adjustment pipe member includes a headpiece and a fixing screw theadable therein, said rotatable shaft includes a flat face in the region of said adjustment pipe member, and said fixing screw is adapted to engage said flat face to removably attach said adjustment pipe member to said rotatable shaft at said different positions thereon.

7. An automatic position control mechanism as in claim 1, 2 or 3 wherein said one end of said spiral spring is removably mounted to said rotatable shaft and said another end of said spiral spring is removably mounted in said sensing unit.

* * * * *